United States Patent [19]
Dupuy

[11] Patent Number: 6,106,911
[45] Date of Patent: Aug. 22, 2000

[54] BELTSTRIP FOR A MOTOR VEHICLE

[75] Inventor: Ronald E. Dupuy, Wabash, Ind.

[73] Assignee: GenCorp. Inc., Fairlawn, Ohio

[21] Appl. No.: 09/193,036

[22] Filed: Nov. 16, 1998

[51] Int. Cl.[7] .................................................. B60R 13/04
[52] U.S. Cl. ......................... 428/31; 428/122; 428/212; 49/490.1; 49/484.1
[58] Field of Search ............................ 428/31, 122, 212; 49/490.1, 484.1

[56] References Cited

U.S. PATENT DOCUMENTS

| | | | |
|---|---|---|---|
| 5,013,379 | 5/1991 | Brooks et al. | 156/244.11 |
| 5,123,988 | 6/1992 | Iwasa | 156/244.11 |
| 5,221,564 | 6/1993 | Keys | 428/31 |
| 5,311,711 | 5/1994 | Desir, Sr. | 52/208 |
| 5,411,785 | 5/1995 | Cook | 428/122 |
| 5,415,822 | 5/1995 | Cook | 264/171 |
| 5,529,650 | 6/1996 | Bowers et al. | 156/64 |
| 5,564,249 | 10/1996 | Borys et al. | 52/716.5 |
| 5,605,736 | 2/1997 | Zohar et al. | 428/122 |
| 5,618,593 | 4/1997 | Belser et al. | 428/31 |

*Primary Examiner*—Alexander S. Thomas
*Attorney, Agent, or Firm*—Brinks Hofer Gilson & Lione

[57] ABSTRACT

A process and apparatus for assembling motor vehicle beltstrips or weatherstrips comprises the steps of providing a weatherstrip preform, passing such preform through a conforming die, applying a hot melt adhesive to a portion of such weatherstrip preform in such die, passing such preform and adhesive into an additional die where a thermoplastic feature is applied to said preform and secured by said hot melt adhesive. Hot melt adhesive may be applied to an additional region of said weatherstrip preform and a trim preform may then also be secured to the weatherstrip preform. The invention also includes the weatherstrip or beltstrip roduct.

18 Claims, 5 Drawing Sheets

BELTSTRIP FOR A MOTOR VEHICLE

BACKGROUND OF THE INVENTION

The invention relates generally to a process of and apparatus for extruding materials onto a preform and more specifically of extruding dissimilar plastic materials onto a weatherstrip preform and the resulting product.

Most motor vehicles are equipped with movable windows that slide in a window opening from an up or extended position that seals off the opening to a down position, retracted within a door, that opens all or a portion of the opening and allows, among other things, an exchange of air between the inside and outside of the vehicle. A sealing device broadly referred to as a weatherstrip is disposed about the periphery of the window opening and provides an air and watertight seal between the vehicle body and the window. The interface between the door and the movable window at the lower extremity of the window opening is typically equipped with a weatherstrip denominated a beltstrip which serves both as aesthetic and mechanical functions. Aesthetically, it hides the interface. Mechanically, it provides a wiper flange or blade for cleaning the window as the window extends and retracts from the vehicle door.

Recently, emphasis has been placed upon vehicle streamlining in order to reduce both aerodynamic drag and wind noise. To achieve these goals, design considerations such as the elimination of all gaps and channels, the reduction of profile configurations, the overlapping of the beltstrip or weatherstrip on the glass, as well as installation ease, serviceability and durability have greatly increased significance. Attainment of such goals depends upon the satisfaction and proper balancing of such design considerations.

Beltstrips and weatherstrips are often extruded or roll-formed in a complex manufacturing process having several steps. Typically, a core metal structure is formed and coated with an extruded layer of synthetic elastomeric material to form a belt molding and then is cut to length. A sealing strip having a flexible blade for contacting the window may be formed and coated in an extrusion process. The sealing strip is then affixed to the belt molding. The belt molding and the sealing strip are usually notched at spaced locations. Clips are then inserted into the notches to connect the belt molding and the sealing strip. The clips also grip an upright edge formed on the door of the vehicle to hold the beltstrip on the door.

Manufacturing and aesthetic flexibility drive the newest beltstrip and weatherstrip products. For example, it is frequently required that a beltstrip be fabricated of distinct plastic or elastomeric parts, such distinct parts display different resiliencies. Moreover, of equal or greater importance is the ability to respond to varying aesthetic requirements. For example, it is now frequently required that weatherstrips include color keyed, i.e., matching or contrasting, color inserts keyed to vehicle body color. Additionally, a specific weatherstrip may include bright work when installed on a vehicle at a certain trim level, whereas at a lower trim level, bright work will not be utilized. A standardized beltstrip which may be modified or augmented to satisfy varying color and trim design would thus be desirable. The present invention is directed to such a product.

SUMMARY OF THE INVENTION

A process and apparatus for assembling a motor vehicle beltstrip or weatherstrip comprises the steps of providing a weatherstrip preform, passing such preform through a conforming die, applying a hot melt adhesive to a portion of such weatherstrip preform in such die, passing such preform and adhesive into an additional die where a thermoplastic feature is applied to said preform and secured by said hot melt adhesive. Hot melt adhesive may be applied to an additional region of said weatherstrip preform and a trim preform may then also be secured to the weatherstrip preform. The resulting weatherstrip product also forms a portion of this invention.

Thus, it is an object of the present invention to provide a process of assembling a beltstrip for motor vehicles and the like.

It is a still further object of the present invention to provide a process for assembling motor vehicle beltstrips and the like wherein a preform is passed through a die, receives a hot melt adhesive and receives an additional strip or feature which is secured to the preform by such adhesive.

It is a still further object of the present invention to provide a process whereby a preform is passed through a die, hot melt adhesive is applied to a region of the preform and a second preform is secured to the first preform.

It is a still further object of the present invention to provide an apparatus for receiving an elongate preform, applying an adhesive and forming a thermoplastic feature on said preform.

It is a still further object of the present invention to provide a beltstrip of a thermoset material having a region of thermoplastic material secured by a hot melt adhesive.

Further objects and advantages of the present invention will become apparent by reference to the following description of the preferred embodiment and appended drawings wherein like reference numbers refer to this same component, element or feature.

DESCRIPTION OF THE PREFERRED AND ALTERNATE EMBODIMENT

Figure 1:
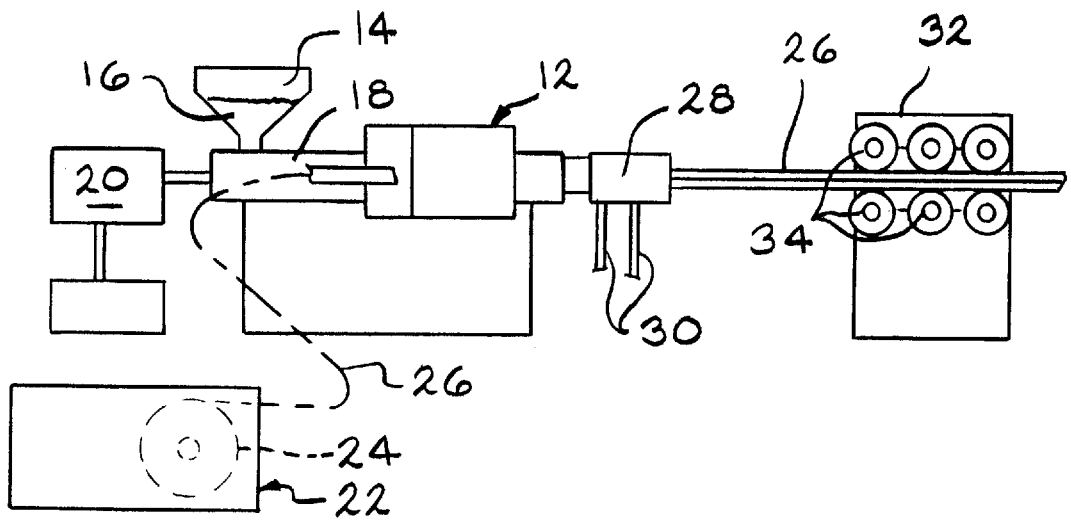
FIG. 1 is a diagrammatic view of a production assembly for carrying out the present invention.

Referring now to FIG. 1, a production line or assembly for carrying out the present invention is illustrated and generally designated by the reference number 10. The production assembly 10 includes a continuously operable molding machine 12 such as an injection molding machine having a hopper 14 which may be filled with and supplies a thermoplastic material 16, often in pellet, powder or granular form, to a conventional auger 18 powered by a drive assembly 20. A preform supply assembly 22 includes a roller or reel 24 having a supply of a preform such as a beltstrip 26.

Figure 6:
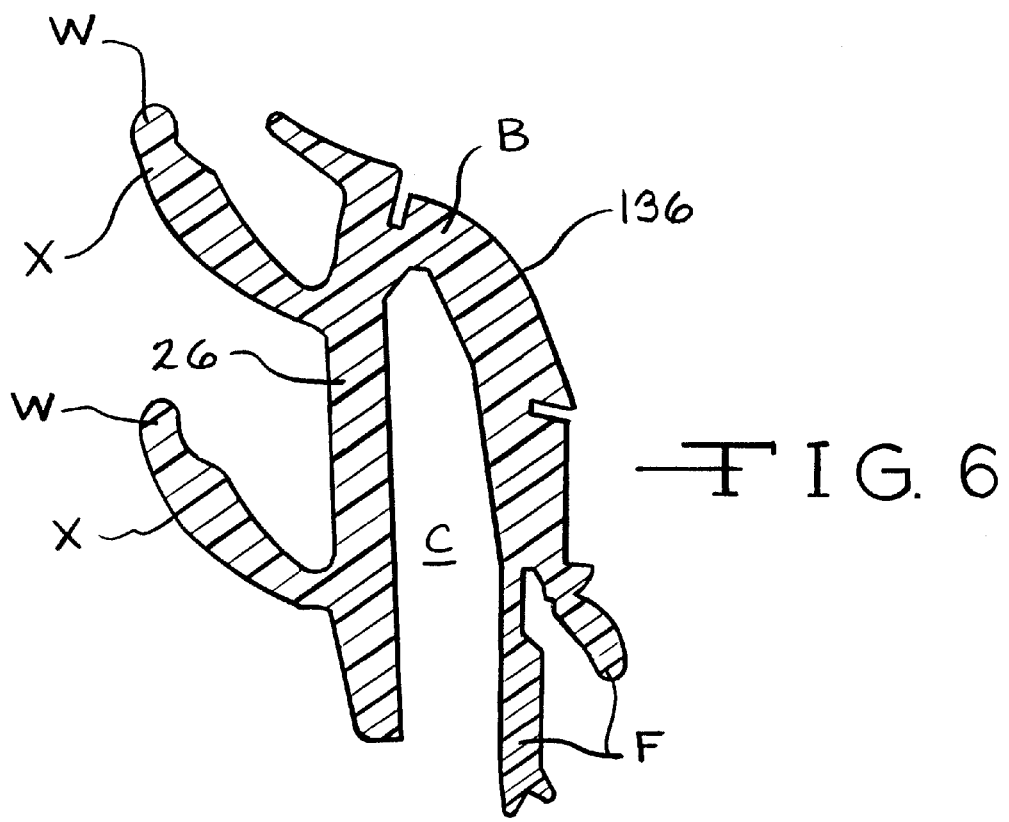
FIG. 6 is a full, sectional view of a weatherstrip preform prior to the process according to the present invention.

The beltstrip preform 26, illustrated in FIG. 6, has preferably been extruded in a previous manufacturing process. Generally speaking, it includes a body B having spaced apart depending legs. From one leg a plurality of flanges or wipers W extend obliquely and engage a vehicle window (not illustrated). The wipers W preferably will include flocking or similar low friction material on their window contacting regions. The legs of the body B define a centrally disposed elongate channel C which receives an upright vehicle body flange (not illustrated) and include flanges F which trim and seal the exterior interface between the beltstrip preform 26 and the vehicle body (not illustrated). The beltstrip preform 26 may define dual durometer elastomers, i.e., materials of different or distinct stiffness ore resilience: the body B may be made of a stiffer elastomer of, for example, 90 durometer material and the wipers W and flanges F may be of a softer elastomer, for example, 70 durometer material.

The beltstrip preform 26 is preferably made of a flexible, thermoset elastomeric material, such as rubber, ethylene-propylene-diene-monomer (EPDM), Santoprene® and the like. Santoprene is a registered trademark of Advanced Elastomer Systems, L.P. of Akron, Ohio.

The beltstrip preform 26 is supplied to the molding machine 12 and undergoes the process described in greater detail below. In its completed form, the preform 26 exits the molding machine 12 and passes through a cooling shroud 28 which may be supplied chilled water through suitable pipes or tubing 30. Spaced from the cooling shroud 28 is a drive or drawing assembly 32 having a plurality of paired, spaced apart, counter-rotating rollers 34 which engage the beltstrip preform 26 and pull it from the preform supply assembly 22, through the molding machine 12 and the cooling shroud 28 as will be readily appreciated.

Figure 2:
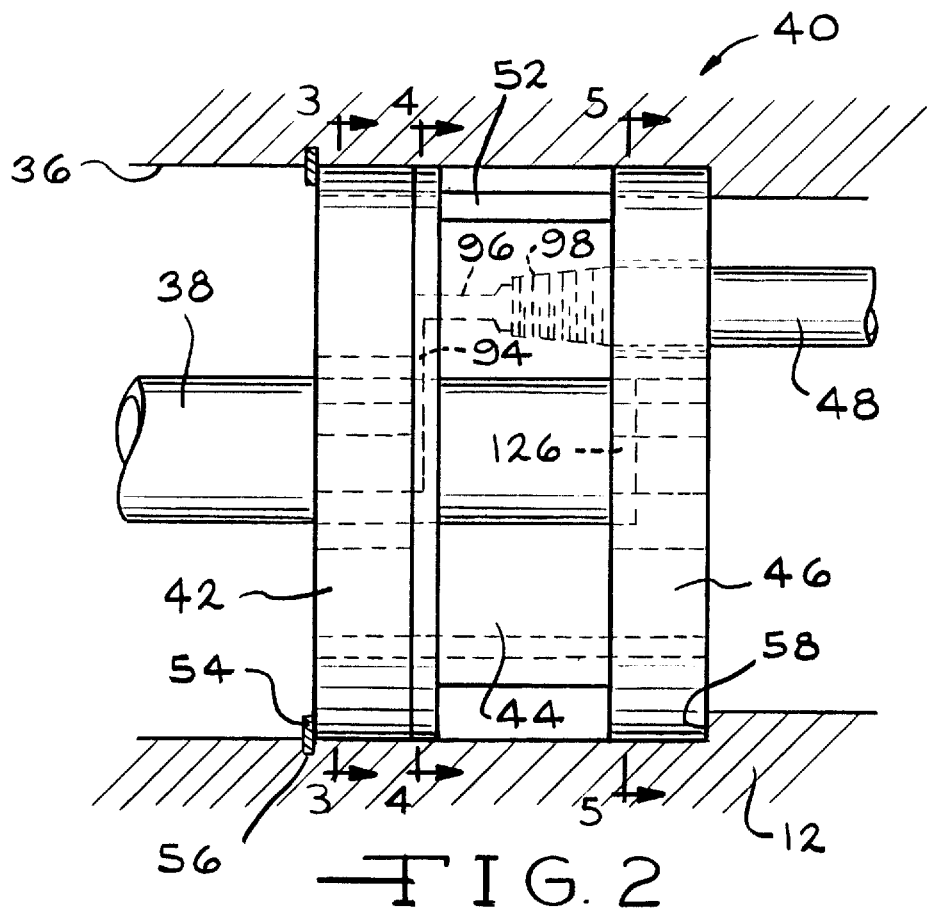
FIG. 2 is a fragmentary, side elevational view in partial sections of a molding machine for carrying out the present invention.

Referring now to FIGS. 1 and 2, disposed within a circular through passageway 36 in the molding machine 12 and configured to receive the beltstrip preform 26 and the output of the auger 18 in a tube or conduit 38 is an application and injection assembly 40. The application and injection assembly 40 includes a face die or plate 42, an intermediate die or body 44 and a back die or plate 46. The tube or conduit 38 carries heated, softened thermoplastic material 16 from the auger 18 to the back plate 46. A smaller tube or conduit 48 provides heated, hot melt adhesive through the body 44 to a region adjacent the front plate 42.

Figure 3:
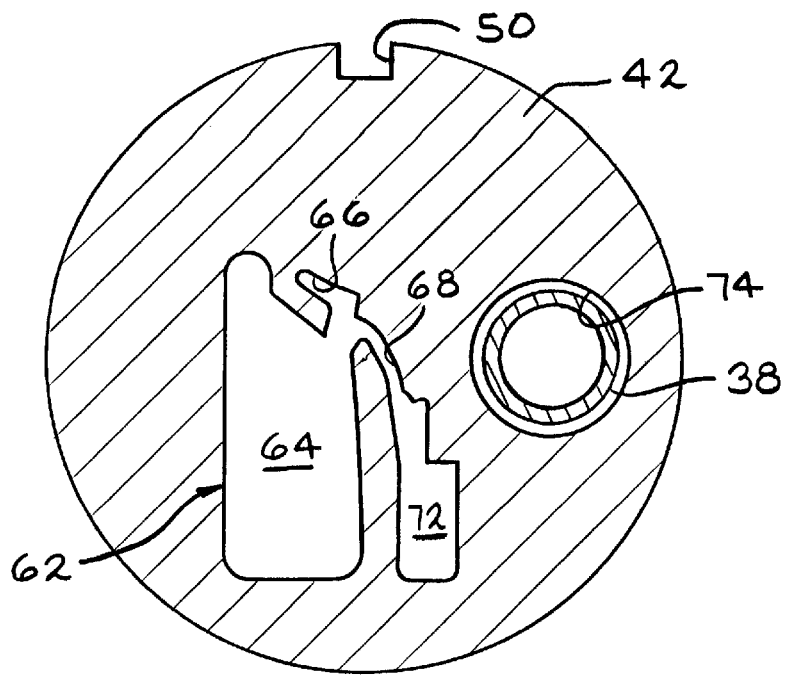
FIG. 3 is a full, sectional view of a front plate of a mold for carrying out the present invention.

Referring now to FIGS. 2 and 3, the front die or plate 42 defines a keyway 50 which orients the circular body of the face plate 42 relative to a key 52 in the molding machine 12 and the body 44. A snap ring 54 which is received within a suitable circumferential channel 56 retains the face plate 42, the body 44 and the back plate 46 against a shoulder 58 within the molding machine 12.

The front plate 42 includes a complex, through passageway 62 which defines a large, generally rectangular region 64 which loosely receives a portion of the body B and the wipers W of the beltstrip preform 26 (See FIG. 6). The through passageway 62 also defines a small or contiguous region 66 which rather closely mimics certain features of the beltstrip preform 26, a narrow throat region 68 which very closely conforms to and mimics the corresponding portion of the preform 26 and another contiguous tail region 72 which generally loosely receives the flanges F of the beltstrip preform 26. Preferably, though not necessarily, the face plate 42 includes an aperture 74 which receives the pipe or conduit 38. It should be appreciated that depending upon the precise configuration of the application and injection assembly 40, the pipe or conduit 38 may be otherwise located and thus obviate the necessity of the circular aperture 74.

Figure 4:
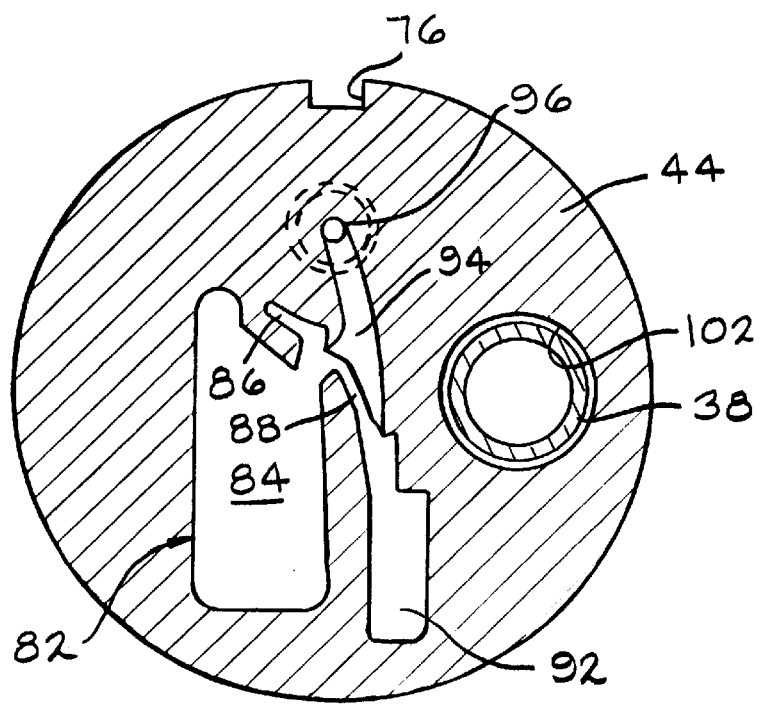
FIG. 4 is a full, sectional view of a hot melt application die body according to the present invention.

Turning then to FIGS. 2 and 4, the intermediate die or body 44 of the application and injection assembly 40 also includes a keyway 76 which registers with the key 52 in the molding machine 12 thereby properly rotationally orienting the body 44 relative to the front plate 42 and back plate 46. The body 44 likewise includes a through passageway 82 having a large, generally rectangular region 84 which aligns with the region 64 in the base plate 42, a small contiguous region 86 which aligns with the region 66 in the face plate 42, a narrow throat region 88 which conforms closely to the corresponding region of the beltstrip preform 26 and aligns with the throat region 68 in the face plate 42 and a contiguous tail region 92 which generally conforms to the corresponding region of the preform 26 and aligns with the region 72 of the face plate 42.

Merging with and extending along one wall of the throat region 88 is a hot melt adhesive delivery passageway 94. The adhesive delivery passageway 94 communicates with an axial bore 96 which, in turn, communicates with the pipe or conduit 48 through which a flow of hot melt adhesive is supplied under pressure. The axial bore 96 communicates with an enlarged threaded region 98 which receive threads on the pipe or conduit 48 in conventional fashion. Finally, the body 44 includes a through aperture 102 which, like the through aperture 74 in the face plate 42, receives the pipe or conduit 38 carrying the thermoplastic material 16.

Figure 5:
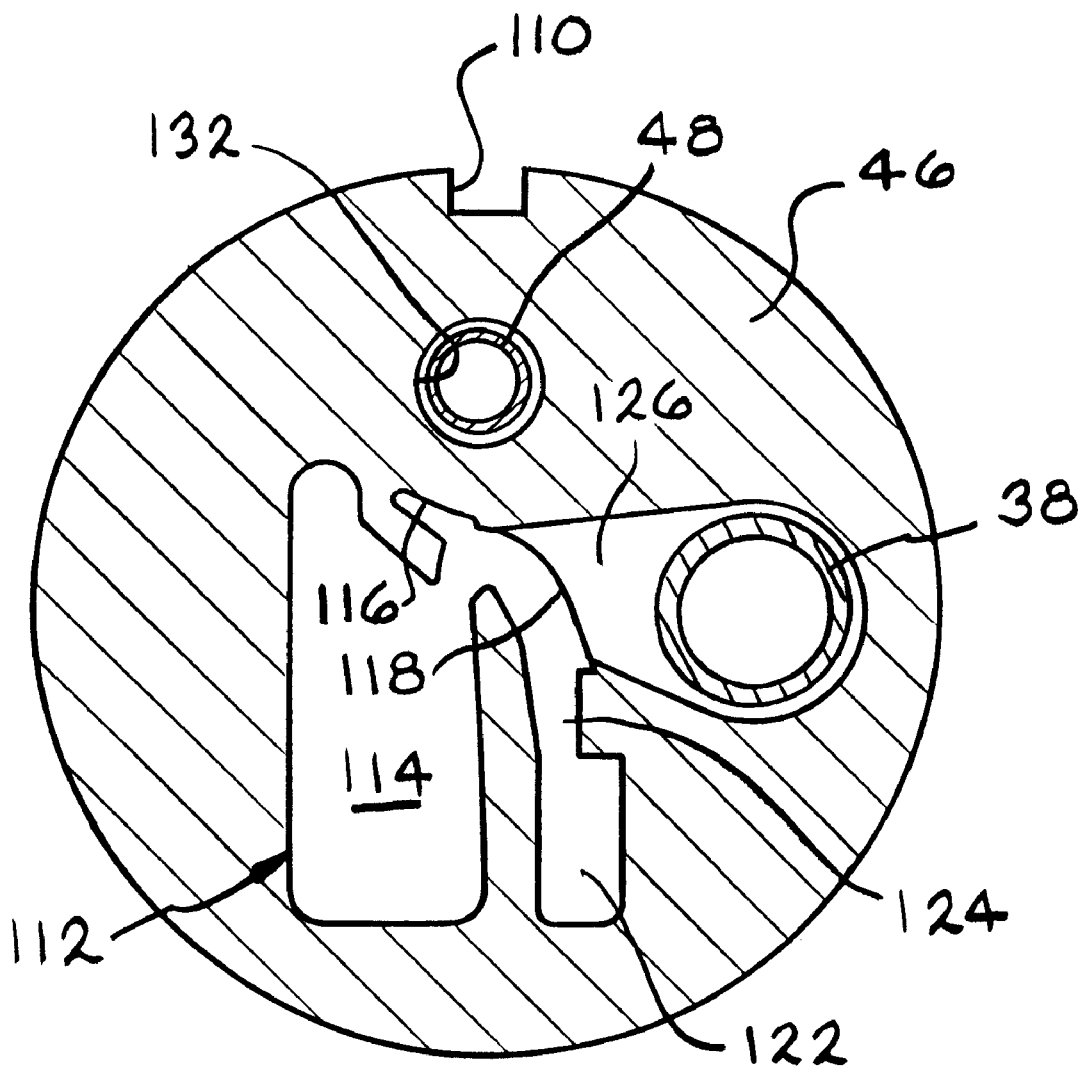
FIG. 5 is a full, sectional view of a back plate for applying thermoplastic material to a region of a preform previously coated with hot melted adhesive.

Referring now FIGS. 2 and 5, the back die or plate 46 also includes a keyway 110 which registers with the key 52 in the molding machine 12 thereby assuring proper registration with the body 44. Once again, the back plate 46 includes a through passageway 112 which aligns with the passageway 82 in the body 44 and the passageway 62 in the face plate 42. The passageway 112 includes a large, generally rectangular region 114 which generally loosely receives corresponding portions of the beltstrip preform 26. The passageway 112 also includes a small region 116 which aligns with the region 86 in the body 44, a throat region 118 which is wider than the throat region 88 of the body 44 and the throat region 68 of the face plate 42 but is generally aligned therewith and a contiguous tail region 122 which aligns with the tail region 92 of the body 44. A narrow region 124 disposed between the throat region 118 and tail region 122 also closely mimics the size and configuration of the corresponding portion of the preform 26. The back plate 46 also includes a thermoplastic delivery passageway 126 which is in fluid communication with the tube or conduit 36. Lastly, the back plate 46 includes a through aperture 132 which receives the pipe or conduit 48 which supplies the hot melt adhesive to the body 44.

With reference now initially to FIGS. 1, 2, 3 and 6, the process according to the present invention will be specifically described. The preform 26 is threaded through the molding machine 12 and specifically through the passageways 62, 82 and 112 of the application and injection assembly 40, through the cooling shroud 28 and the rollers 34 of the drawing assembly 32. The auger 18 is activated as well as appropriate heating devices (not illustrated) in the molding machine 12 to achieve appropriate melting of the thermoplastic material 16 which has been provided in the hopper 14. When operation is commenced, the preform 26, as illustrated in FIG. 6, is correspondingly disposed in the passageway 62. Specifically, a curved, intermediate portion 136 of the preform 26 is disposed in the narrow throat region 68 such that a reasonably tight seal is achieved therebetween.

Figure 7:
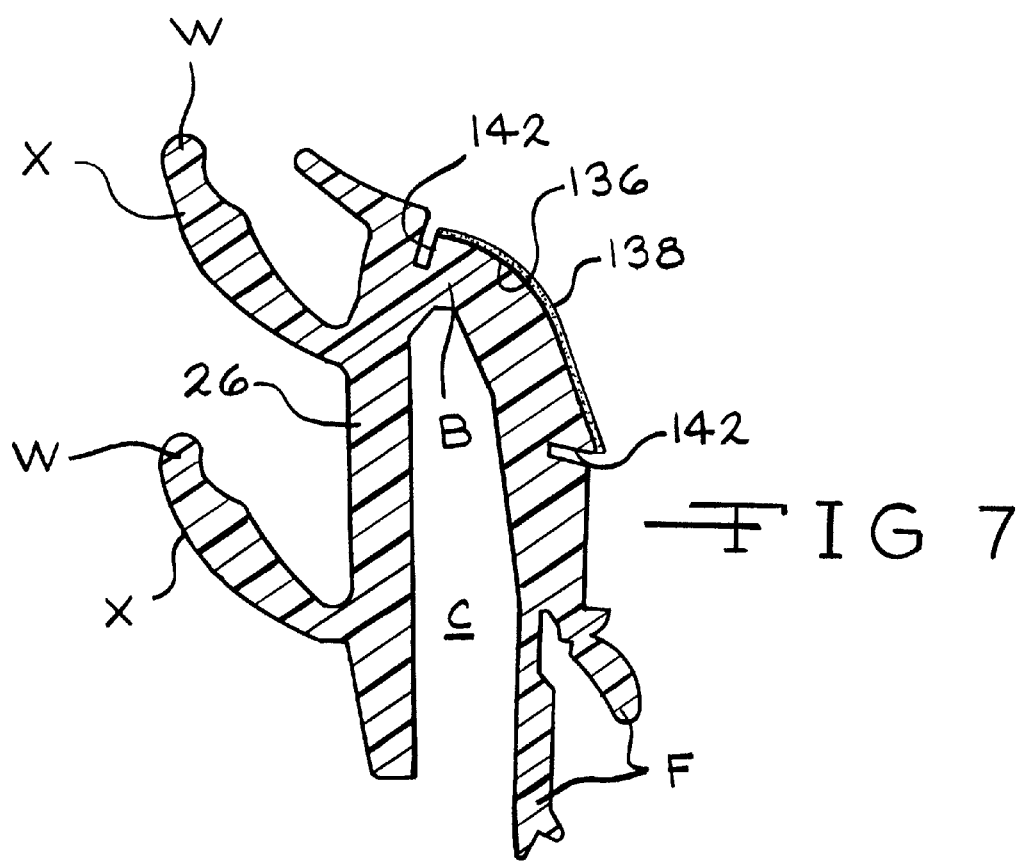
FIG. 7 is a full, sectional view of a beltstrip preform to which hot melt adhesive has been applied.

Referring then to FIGS. 2, 4 and 7, as the preform 26 moves through the face plate 42 and into the body 44, hot melt adhesive passes through the tube or conduit 48, through the axial passageway 96 and into the supply passageway 94. A thin layer of hot melt adhesive 138 is thus applied to the curved, intermediate region 136 of the preform 26. The hot melt adhesive may be any weather resistant adhesive compatible with the material of the beltstrip preform 26 and thermoplastic material 26, both described in more detail elsewhere in this document.

Figure 8:
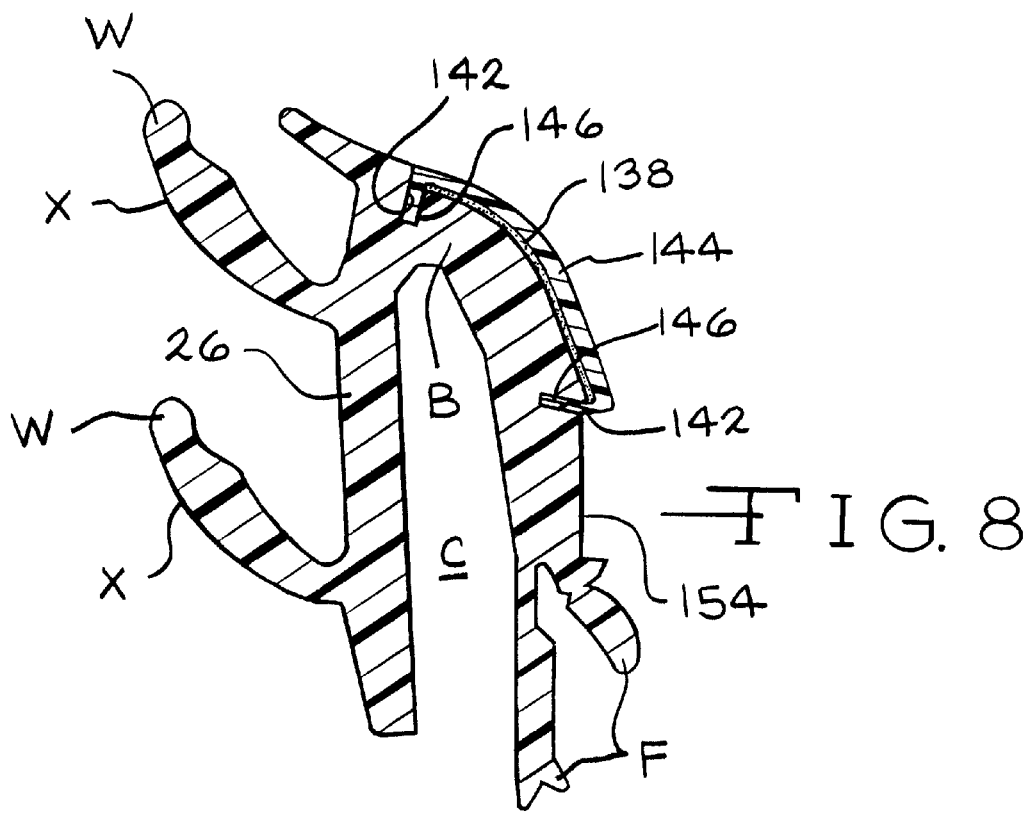
FIG. 8 is a full, sectional view of a beltstrip preform to which both hot melt adhesive and a thermoplastic feature have been applied.

Referring now to FIGS. 2, 5 and 8, the preform 26 with the thin layer of hot melt adhesive 138 applied to the intermediate region 136 then moves farther through the body 44 and to the back plate 46 where the flow of thermoplastic material 16 delivered through the conduit 36 moves through the delivery passageway 126 into contact with the hot melt adhesive 138 and also into a pair of notches or channels 142 in the beltstrip preform 26 which flank the central region 136. The back plate 46 thus applies an exterior surface layer 144 of thermoplastic material 16 which is tightly secured to the preform 26 by the thin layer of hot melt adhesive 138. Thermoplastic material 16 flowing into the notches 142 integrally forms a pair of ears 146 which are oriented at acute angles to the adjacent region of the exterior surface layer 144 thereby defining hooks which mechanically retain the exterior surface layer 144 on the beltstrip preform 26.

The exterior surface layer 144 serves as an outer decorative component made from material to meet color, gloss and weatherability requirements of an individual motor vehicle manufacturer. The exterior surface layer 144 may be made of a wide variety of thermoplastic materials 16 well-known in the art. For example, the exterior surface layer 144 may be made of a colored, weatherable grade, acrylic-styrene-acrylonitrile polycarbonate (ASA/PC) alloy. The exterior surface layer 144 may also be made of combinations of nylon alloy materials, such as ASA, thermoplastic (TPO), polyvinyl chloride (PVC) and the like. In addition, the exterior surface layer 144 may be made of body matched, painted thermoplastic material from any variety of thermoplastic families based on ABS, PET, PBT, polyamide (nylon) (PA) and the like.

Figure 9:
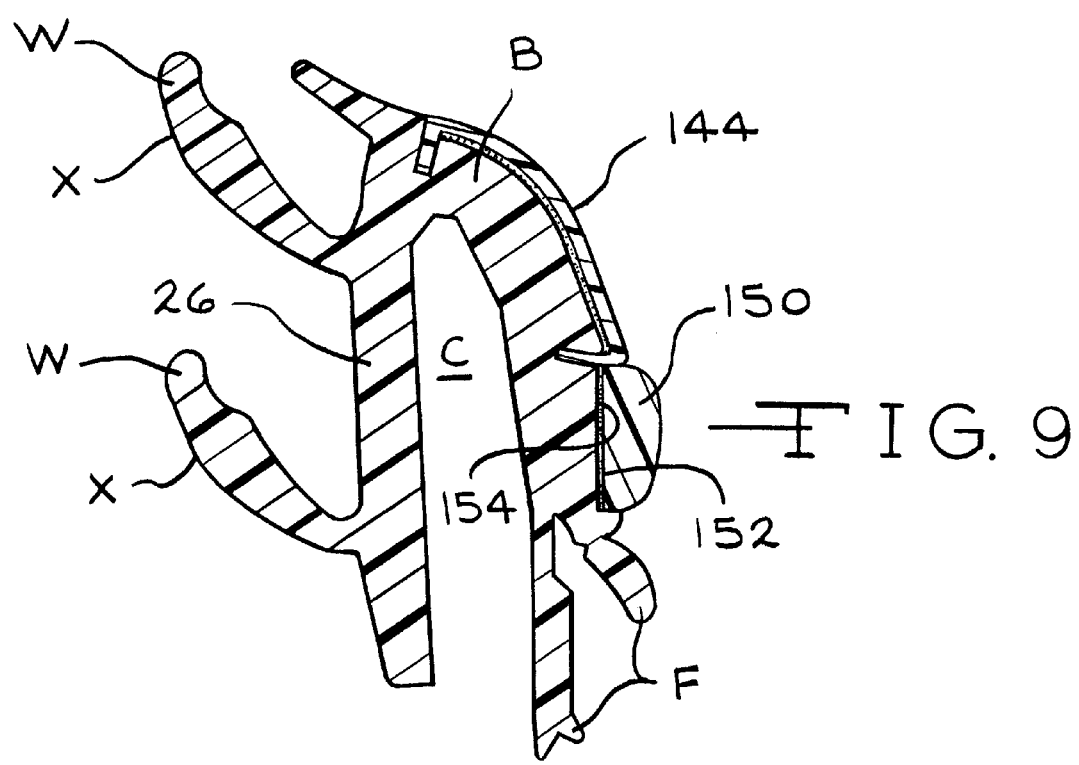
FIG. 9 is a full, sectional view of a completed beltstrip to which hot melt adhesive, a thermoplastic feature and a trim strip have been applied.

Referring now to FIG. 9, an additional trim strip 150 which may have a complementary or contrasting finish or may be aluminized or reflective bright work and is preferably secured by an additional region or layer of hot melt adhesive 152 covering a complementarily configured channel or slot 154. The additional region of hot melt adhesive 152 may be applied by widening the supply passageway 94 of the body 44 to include the slot 154 of the preform 26. Alternatively, the trim strip 150 may be omitted or it may be added at any convenient and suitable or subsequent time to complete the preform 26.

Assembly of the beltstrip preform 26 into a beltstrip is now complete and the completed beltstrip may be moved through the cooling shroud 28, being pulled by the rollers 34 of the drawing assembly 32. Inasmuch as the completed beltstrip 26 is made in a substantially continuous and indefinite length, it will be appreciated that for use, it will be cut into short (approximately 3 foot) lengths and may undergo further processing to add, for example, molded-on end caps.

The foregoing disclosure is the best mode devised by the inventor for practicing this invention. It is apparent, however, that apparatus incorporating modifications and variations will be obvious to one skilled in the art of weatherstrips and beltstrips. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A beltstrip for a motor vehicle comprising, in combination, a generally U-shaped body having a first side and a second side and a central slot adapted to receive a flange of a motor vehicle body member, at least a pair of generally parallel wiper blades extending from said first side of said body, a pair of channels in said second side extending toward said first side and defining an intermediate region, and a region of thermoplastic material extending across said intermediate region and into said channels.

2. The beltstrip for a motor vehicle of claim 1 further including at least one flange extending from said second side.

3. The beltstrip for a motor vehicle of claim 1 wherein said thermoplastic region is mechanically retained upon said second side of said preform.

4. The beltstrip for a motor vehicle of claim 1 further including an additional surface adjacent one of said channels, a layer of hot melt adhesive on said second surface and a trim strip adhered to said second surface by said hot melt adhesive.

5. The beltstrip for a motor vehicle of claim 1 further including flocking disposed on said wiper blades.

6. The beltstrip for a motor vehicle of claim 1 wherein said body is made of a thermoset material having regions of distinct resilience.

7. A beltstrip for a motor vehicle comprising, in combination, a generally U-shaped body having a first side and a second side and a central slot adapted to receive a flange of a motor vehicle body member, at least a pair of generally parallel wiper blades extending from said first side of said body, a pair of channels in said second side extending toward said first side and defining an intermediate region, a region of thermoplastic material extending across said intermediate region and into said slots, and said beltstrip defining dual durometer elastomers.

8. The beltstrip for a motor vehicle of claim 7 further including at least one flange extending from said second side.

9. The beltstrip for a motor vehicle of claim 7 wherein said thermoplastic region is mechanically retained upon said second preform.

10. The beltstrip for a motor vehicle of claim 7 further including an additional surface adjacent one of said channels, a layer of hot melt adhesive on said second surface and a trim strip adhered to said second surface by said hot melt adhesive.

11. The beltstrip for a motor vehicle of claim 7 further including flocking disposed on said wiper blades.

12. The beltstrip for a motor vehicle of claim 7 wherein said body is made of a thermoset material having regions of distinct resilience.

13. A beltstrip for a motor vehicle comprising, in combination,
- a generally U-shaped body having a first side and a second side and a central slot adapted to receive a flange of a motor vehicle body member,
- at least a pair of generally parallel wiper blades extending from said first side of said body,
- a pair of channels in said second side extending toward said first side and defining an intermediate region,
- a region of thermoplastic material extending across said intermediate region and into said slots, and
- a molded on end cap on each end of said beltstrip.

14. The beltstrip for a motor vehicle of claim 13 further including at least one flange extending from said second side.

15. The beltstrip for a motor vehicle of claim 13 wherein said thermoplastic region is mechanically retained upon said second preform.

16. The beltstrip for a motor vehicle of claim 13 further including an additional surface adjacent one of said channels, a layer of hot melt adhesive on said second surface and a trim strip adhered to said second surface by said hot melt adesive.

17. The beltstrip for a motor vehicle of claim 13 further including flocking disposed on said wiper blades.

18. The beltstrip for a motor vehicle of claim 13 wherein said body is made of a thermoset material having regions of distinct resilience.

* * * * *